May 1, 1956 W. G. HILL 2,743,505
JOINTS FOR COAXIAL CABLE
Filed April 14, 1951 2 Sheets-Sheet 1
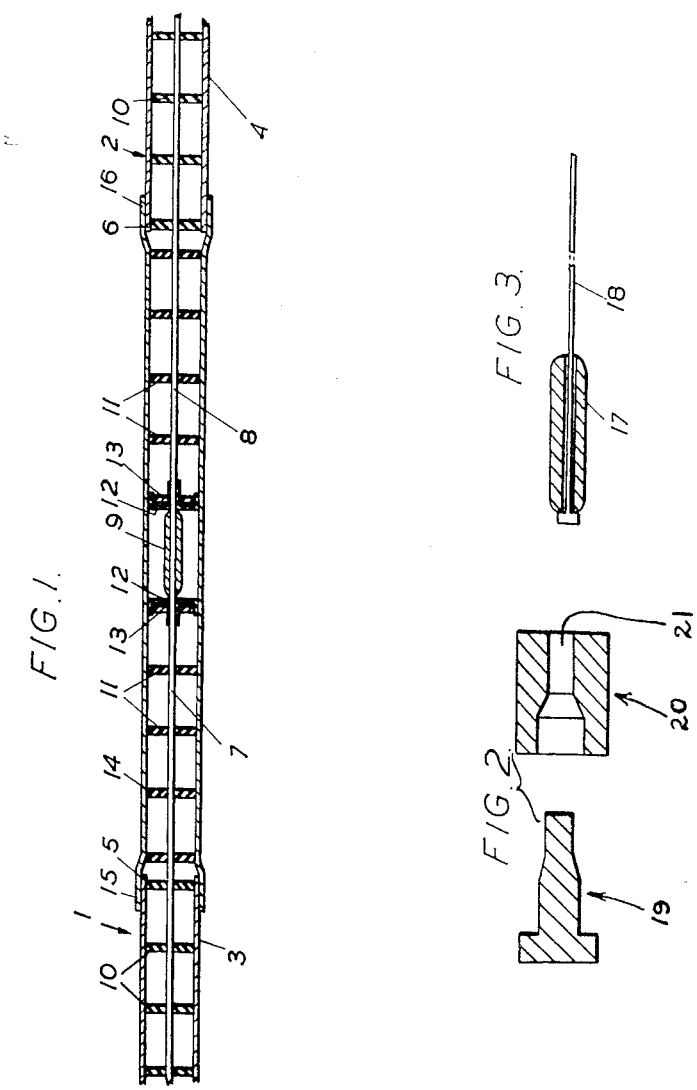
Inventor
WILLIAM GEORGE HILL
By [signature]
Attorney May 1, 1956 W. G. HILL 2,743,505
JOINTS FOR COAXIAL CABLE
Filed April 14, 1951 2 Sheets-Sheet 2

INVENTOR.
WILLIAM GEORGE HILL
BY
ATTORNEY

United States Patent Office 2,743,505
Patented May 1, 1956

2,743,505

JOINTS FOR COAXIAL CABLE

William George Hill, London, England, assignor to International Standard Electric Corporation, New York, N. Y., a corporation of Delaware Application April 14, 1951, Serial No. 221,007

Claims priority, application Great Britain April 18, 1950

3 Claims. (Cl. 29—155.5)

This invention relates to coaxial telecommunication cables and in particular to joints in the coaxial cores of such cables.

Coaxial telecommunication cables are designed to operate at relatively high frequencies and at these frequencies the reflections introduced by the structural discontinuities at joints between adjacent lengths of coaxial core may result in impairment of the transmission properties of the cable. To obviate this it is customary to make the structural discontinuity at a joint as short as possible. In other words, the inner conductors of the two core lengths to be joined are connected together by means of a jointing ferrule slipped over and soldered to the two conductor ends and a short sleeve is slipped over the ends of the two outer conductors and soldered thereto. In order to provide access for welding or soldering of the abutting ends of the inner conductors it has been necessary heretofore to foreshorten the ends of both the outer conductors. As a result, when the ends of the inner conductors are in abutting relation there is a gap between the ends of the outer conductors and this gap is usually bridged by a short metal sleeve. There is therefore a small structural and therefore electrical discontinuity at such a joint since the sleeve over the outer conductor ends will be of slightly greater internal diameter than that of the outer conductor of the core.

A principal object of the invention is to provide improved methods of joining coaxial cable elements or lines, whereby the impedance characteristics are substantially uniform and electrical non-uniformities throughout the joint are reduced to an absolute minimum.

A feature of the invention relates to a method of joining the ends of two coaxial line sections by cutting back the outer conductor of one or both sections to leave the center conductor protruding for a substantial length to provide adequate space for welding or otherwise joining the abutting ends of the inner conductors. One of the cut-away ends of the outer conductor is then used as the splicing element for the cut-away end of the other outer conductor.

Another feature relates to a novel method of joining coaxial line sections whereby special splicing sections are avoided, resulting in substantial economy and improved impedance characteristics.

The nature of the invention will be understood from the following description of a joint made according to the invention and as illustrated in the drawing in which:

Fig. 1 shows in section a joint according to one embodiment of the invention;

Fig. 2 shows in section a tool used in the construction of the joint;

Fig. 3 shows in section another tool used in the construction of the joint;

Figure 1A:
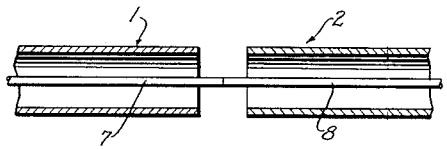
Figs. 1A and 1B illustrate one prior known method of forming a coaxial joint.

Normally such coaxial cables are installed in trenches or are drawn into ducts and the joints between successive manufacturing lengths are made in the field after the lengths have been placed in position. The joints themselves can be made as short as is practically possible so as to minimize the discontinuity. There is, however, a disadvantage in making these short joints in that the soldered connection between the inner conductors and the two soldered connections between the outer sleeve of the joint and the ends of the two outer conductors are all rather close together so that the joint as a whole is somewhat rigid and liable to be damaged if subjected to bending. This is not of great importance when the joints are all made after the cable lengths have been placed in their final positions but occasions arise when it is desirable to make the joints between a number of lengths in the factory and then to transport the jointed cable to the locality where it is to be laid.

It is evident, for example, that joints in submarine cables must be made before the cable is placed in position. In these cases the joints should, so far as is possible have the same flexibility as the cable so that the complete length of cable including joints can be coiled on drums or in the tanks of a cable ship and passed around the cable ship's paying out machinery.

A coaxial cable core of the type under consideration comprises a central or inner conductor surrounded by a tubular outer conductor maintained in coaxial relation with the inner conductor by insulating and separating means. A common form of insulating means consists of a regularly spaced sequence of slotted discs mounted on the inner conductor.

The outer conductor is usually constructed by the longitudinal folding of a metallic tape into tubular form, the two edges of the tape abutting along a seam parallel to the axis of the core.

In some cases the tape is provided with transverse corrugations to increase its flexibility.

So that the abutting edges of the tape shall not override they are provided with inter-engaging teeth or are otherwise specially shaped. It is also possible to provide a separate seaming strip consisting of a narrow H-shaped strip into which the edges of the outer conductors fit. The core is completed by an outer binding of steel tape which serves to keep the conductor tape edges abutting and also provides a magnetic screen. The present invention enables flexible joints to be made in all cores in which the outer conductor is formed by the longitudinal folding of a tape since it enables sleeves of any desired length to be used without introducing any appreciable impedance discontinuity.

Accordingly the present invention consists of a joint between two coaxial conductor cable cores comprising a relatively long outer sleeve connecting the outer conductors of the two cores that are jointed together said sleeve having substantially the same construction and dimensions as the said outer conductors.

It can be seen that the two soldering points and the point of junction of the two inner conductors may be sufficiently spaced apart as not to produce any undue rigidity in the joint as a whole.

The invention further provides a method of manufacing a joint between two lengths of coaxial conductor cable core of the kind having an outer tubular conductor formed by folding a single tape longitudinally until the edges of said tape abut comprising the steps of removing from each of the core ends to be joined a desired length of outer conductor, slightly expanding for a short distance the two ends of a suitable length of empty tube of the same construction, material and dimensions, as the outer conductors to form a sleeve with end sockets, opening up the longitudinal seam in said sleeve, slipping said sleeve over the outer conductor of one of the lengths to be joined, joining the inner conductors, slipping said sleeve along to bridge the gap between the outer conductors of the two lengths to be joined, pressing the edges of said sleeve together to reform it as a tube and soldering or welding the expanded ends of the tubular sleeve to the ends of the outer conductors of the two core ends.

It is also possible to make use of part of the actual outer conductor of one of the core ends to form the sleeve without detaching the part from the main length of the outer conductors as will be explained later.

Normally these joints will be made in the cable factory and accordingly it may be convenient to connect the inner conductors by butt-welding the ends. The outer sleeve is formed of a length of tubular outer conductor and may conveniently be a piece removed from one of the ends at the time of making the joint. The length of the sleeve is chosen according to requirements and may be as much as two feet, in any case it will normally be considerably greater than the length of the sleeve used when flexibility is not important. The ends of the tubular sleeve are expanded slightly, for a short distance, say half an inch, by the use of a special tool so that they will fit closely over the ends of the cable outer conductors to form a spigot and socket joint.

The tubular conductor is then opened up by drawing or pushing through it a mandrel of somewhat larger diameter than the inner diameter of the tube. A convenient tool for the purpose is a pull-through as used for cleaning rifles in which the "weight" is a hydraulic metal body with rounded ends, the "weight" being pulled through the tube on the end of a length of wire or string.

The opened up sleeve is preferably slipped over one of the cable ends before the joint in the inner conductor is made. After the inner conductor joint is made and the insulating structure put in place, the sleeve is slipped into its final position and closed so that its edges abut. The ends are then soldered or welded to the ends of the cable outer conductors. The core joint is finally completed with a binding of steel tape.

Figure 1B:
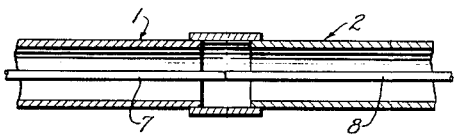

Figs. 1A and Fig. 1B show a conventional method of forming a coaxial line joint. The outer conductors of both line sections are cut back with respect to the inner conductors so that a suitable welding tool, soldering tool, or other device can be inserted to join the abutting ends of the inner conductors together. Therefore, when the gapped outer conductors are bridged by a small metal sleeve as shown in Fig. 1B there is a substantial nonuniformity of the inner diameter of the joined conductors.

In Fig. 1 according to the invention there are shown the two core ends 1 and 2 which are to be joined. The outer conductors 3 and 4 are cut at points 5 and 6 while the inner conductors extend to the centre of the joint where they are shown joined by means of a ferrule 9 in the normal manner. As explained above, in some cases it may be preferable to make the joint between the inner conductors by butt-welding.

The outer conductors 3 and 4 are supported on insulating and separating discs 10 and similar discs 11 are mounted on the exposed portion of the inner conductors 7 and 8. It will be noticed that in the figure there are shown two insulating and separating units each built up of components 12 and 13. These units are water tight barriers. Component 12 is a hydraulic type washer such as is used in a reciprocating water pump, and is made of a resilient material such as soft rubber. Component 13 is an apertured disc of a hard insulating material which is pressed into the washer 12. The use of these hydraulic type washers in cable joints is described in British Patent No. 678,236, filed on April 18, 1950 and issued on December 15, 1952.

After the insulating discs have been arranged in position and the centre conductors joined the sleeve 14 connecting the outer conductors is applied. This sleeve consists of a length of outer conductor of exactly the same kind as that shown at 3 and 4 on the cable cores. A suitable length of tubular outer conductor is selected and the ends are expanded by the use of the press tool shown in Fig. 2, in which the piston 19 is pressed into the body 20 after the end of the length of tubular conductor has been inserted in the aperture 21 in the body 20. This results in the end of the tube being slightly expanded to form the socket 15 shown in Fig. 1.

When the two ends of the sleeve 14 have been expanded to form the sockets 15 and 16 the length of tube is opened up along its longitudinal seam. This can conveniently be done by drawing the "weight" of a pull-through of suitable diameter through the tube. In Fig. 3 there is shown such a tool comprising a "weight" 17 attached to a length of copper wire 18. Other forms of mandrel would equaly serve to open up the sleeve. The opened up sleeve is then placed in position over the expanded lengths of inner conductors carrying the insulating discs and pressed back into tubular form with the edges adjoining. The sockets 15 and 16 are then soldered to the ends of the outer conductors 3 and 4 and the core joint is finished off with a binding of steel tape (not shown).

Figure 4A:
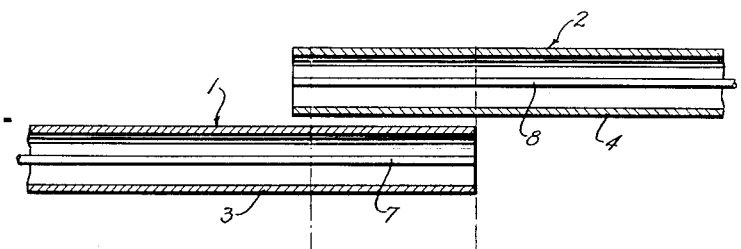
Figs. 4A, 4B, 4C and 4D represent successive steps for forming a joint according to an alternative embodiment of the invention.
Figure 4B:
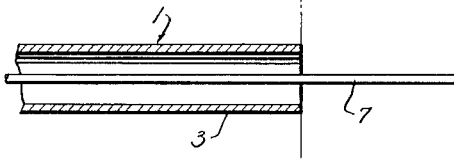
Figure 4C:
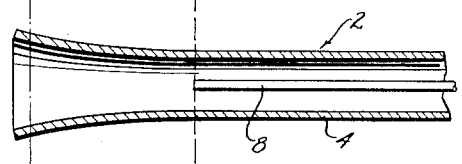
Figure 4D:
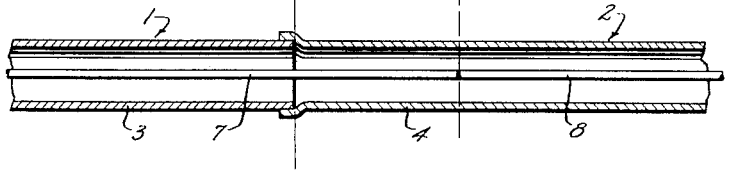

An alternative method of making a flexible joint which does not involve the use of a separate outer sleeve is illustrated in Figs. 4A, 4B, 4C and 4D. As shown in Fig. 4A, the two core ends to be joined are brought into position with a considerable overlap, such as 9 to 12 inches or more, and are firmly held. The outer conductor of one of the ends, for example the left hand end, is then cut away so as to leave only about ½" overlap with the outer conductor of the right hand end, as indicated by the dot-dash line running through Figs. 4A and 4B. The inner conductor of the left hand section will now, of course, be projecting some 9 or 12 inches according to the original overlap. The outer conductor of the right hand section is then spread open by the use of a suitable tool, for a distance slightly greater than the length of the projecting portion of the inner conductor of the left hand section, as shown in Fig. 4C. The end of this spread-open section is expanded, as indicated in Fig. 4D, to produce the socket for the spigot and socket joint previously described. It will be understood that this expansion can be effected by using the tool elements 19 and 20 (Fig. 2) so that when the element is forced into the opened up end of the right hand line section it forms the expanded socket. The remainder of the right hand section is prevented from expanding and opening because it closely fits within the bore 21. When the expanded socket has been thus formed on the end of the right hand section the inner conductor of that section is then cut, as indicated by the dotted line running through Figs. 4A, 4B and 4C, the cutting being such that the end of the inner conductors of both sections abut against each other, as shown in Fig. 4D. These abutting ends of the inner conductors are then joined, as described above, after which the spread-open portion of the outer conductor of the right hand section is pressed back into position, and the expanded socket end thereof is fitted over the non-expanded end of the outer conductor of the left hand section to which it can be soldered. As before, the joint is completed with a binding of steel tape.

It can be seen that the ratio of the diameter of the outer conductor to that of the inner conductors is substantially constant over the greater part of the joint so that impedance discontinuity is avoided, while the sleeve can be made as long as is desired. The joint in the centre conductor is at some distance from the joints between the sleeve and the outer conductors so that the flexibility is not seriously impaired.

It will be understood that this invention relates to the making of flexible joints in coaxial cable cores and that the invention can be used in conjunction with previously known methods for making water-tight barrier joints or substantialy reflection-free joints.

While the principles of the invention have been described above in connection with specific embodiments and particular modifications thereof, it is to be clearly understood that this description is made only by way of example and not as a limitation on the scope of the invention.

What I claim is:

1. The method of manufacturing a joint between two lengths of coaxial conductor cable core of the kind having an outer tubular conductor formed by folding a single tape longitudinally until the edges of said tape abut comprising the steps of removing from each of the core ends to be joined a desired length of outer conductor, slightly expanding for a short distance the two ends of a suitable length of empty tube of the same construction material and dimensions as the outer conductors to form a sleeve with end sockets, opening up the longitudinal seam in said sleeve, slipping said sleeve over the outer conductor of one of the lengths to be joined, joining the inner conductors, slipping said sleeve along to bridge the gap between the outer conductors of the two lengths to be joined, pressing the edges of said sleeve together to re-form it as a tube and soldering or welding the expanded ends of the tubular sleeve to the ends of the outer conductors of the two core ends.

2. The method of making a joint between two coaxial conductor cable cores of the kind having an outer tubular conductor formed by folding a single tape longitudinally until the edges of said tape abut comprising the steps of expanding the outer conductor for a short distance at one of the core ends sufficiently to fit over the other outer conductor, opening up the first mentioned outer conductor for a greater distance, cutting the inner conductor corresponding thereto and the outer conductor of the other outer end and bringing two ends of the two cores together so that the inner conductors abut in the middle of said opened up length of outer conductor and said opened up length overlaps the other outer conductor, joining the inner conductors together, pressing the edges of the opened up outer conductor together to re-form it as a tube and soldering or welding its expanded end to the other outer conductor.

3. The method of making a flexible electrical connecting joint between a longitudinally folded outer conductor of a coaxial cable and a longitudinally seamed malleable tubular member of similar outside and inside diameters to said conductor, comprising expanding for a short distance one end of said tubular member so that its inside diameter is approximately equal to the outside diameter of said outer conductor, opening up said tubular member along its longitudinal seam, slipping said tubular member over said outer conductor so that the expanded end acts as a socket with respect to said outer conductor, and soldering or sealing the expanded end of the tubular member on said outer conductor.

References Cited in the file of this patent

UNITED STATES PATENTS

| | | |
|---|---|---|
| 311,522 | Patterson | Feb. 3, 1885 |
| 1,742,354 | Hunter | Jan. 7, 1930 |
| 1,911,775 | Smith et al. | May 30, 1933 |
| 2,156,772 | Seeley | May 2, 1939 |
| 2,209,181 | Wendel | July 23, 1940 |
| 2,276,571 | Grypma | Mar. 17, 1942 |
| 2,402,451 | Scott et al. | June 8, 1946 |
| 2,459,877 | Gillis | Jan. 25, 1949 |
| 2,499,853 | Eckel et al. | Mar. 7, 1950 |
| 2,538,225 | Alford | Jan. 16, 1951 |